Figure 1:
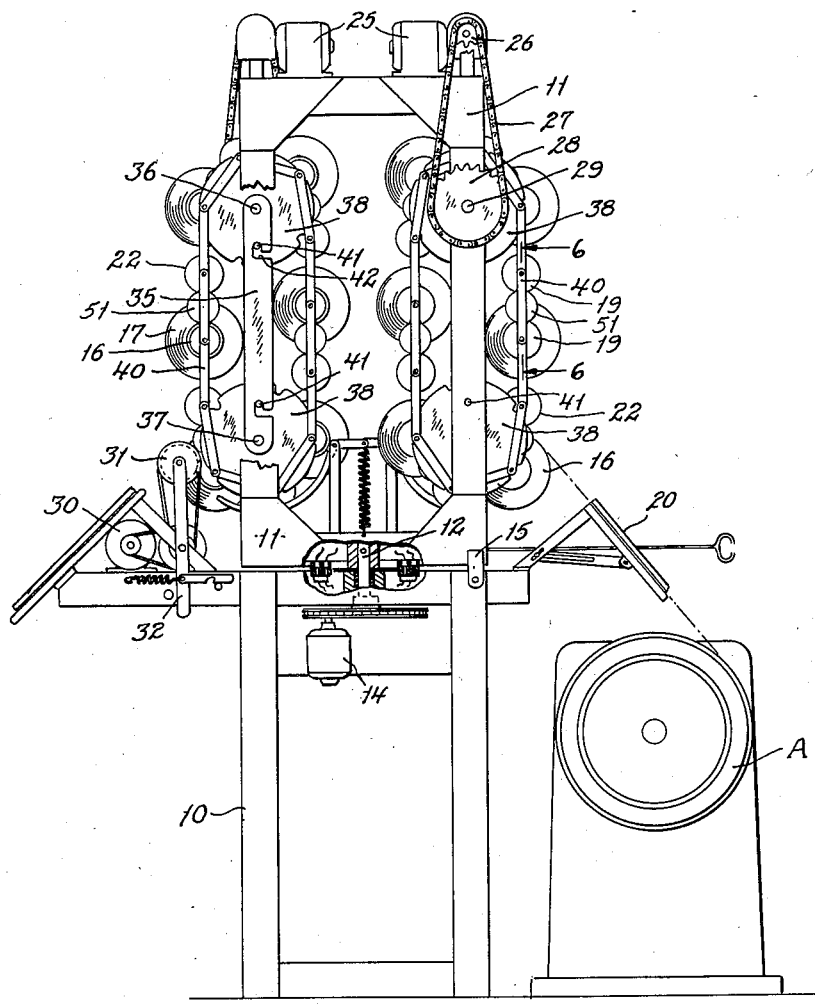

March 24, 1942.   H. C. BOSTWICK   2,277,476
STRIP FEEDING APPARATUS
Filed March 15, 1939   3 Sheets-Sheet 1

INVENTOR.
HENRY C. BOSTWICK
BY Bates, Golrick, & Teare
ATTORNEYS

March 24, 1942. H. C. BOSTWICK 2,277,476
STRIP FEEDING APPARATUS
Filed March 15, 1939 3 Sheets-Sheet 2
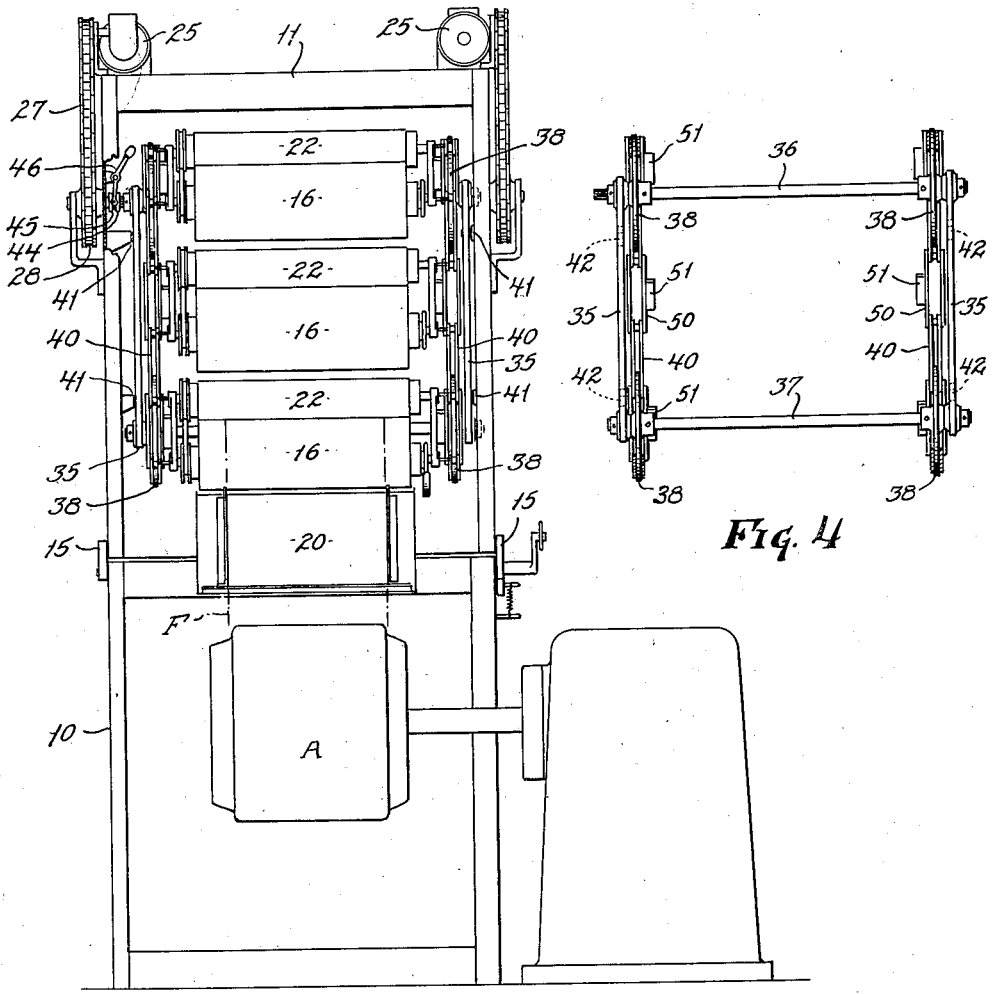
Fig. 3
Fig. 4
Fig. 5
INVENTOR.
HENRY C. BOSTWICK
BY 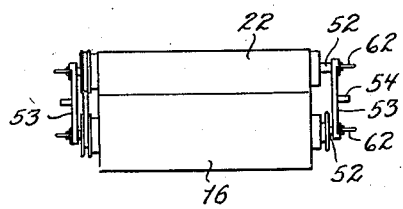
ATTORNEYS March 24, 1942.   H. C. BOSTWICK   2,277,476
STRIP FEEDING APPARATUS
Filed March 15, 1939   3 Sheets-Sheet 3

INVENTOR.
HENRY C. BOSTWICK
BY Bates, Golrick, & Teare
ATTORNEYS

Patented Mar. 24, 1942

2,277,476

UNITED STATES PATENT OFFICE 2,277,476

STRIP FEEDING APPARATUS

Henry C. Bostwick, Akron, Ohio, assignor to The Akron Standard Mold Company, Akron, Ohio, a corporation of Ohio Application March 15, 1939, Serial No. 262,017

7 Claims. (Cl. 154—10)

This invention relates to a strip feeding apparatus for use with tire-building machines, and more particularly is concerned with a strip storage mechanism in which individual strips may be stored and readily withdrawn for use in a tire-building machine of the type used to build semi-flat or drum-built tires. This invention is an improvement over that type of apparatus illustrated, described and claimed in my copending application for Letters Patent Serial No. 179,119, filed December 10, 1937, now Patent No. 2,242,810, granted May 20, 1941.

The general object of the present invention is to provide an improved stock storage mechanism for conveniently storing individual strips of stock, so arranged as to facilitate the withdrawal of such strips one at a time, to enable substantially continuous operation of the tire-building machine with which the invention is used, and in such a manner as will result in an increased tire-building production; such increased production being enabled by the provision of a stock storage mechanism which may be rapidly and efficiently recharged or replenished with a fresh supply of stock.

In my prior application I disclosed a strip storage and feeding apparatus having a plurality of groups of stock storage rolls arranged so that certain of the groups may be charged by one attendant while another attendant operated a tire-building machine, and withdrew the stock from previously charged storage groups. In such device the supplying station had to be located opposite or adjacent to the withdrawing station. In the present invention I have provided a strip feeding apparatus, so arranged that the storage groups may be replenished without requiring the replenishment station to be located adjacent the withdrawal station.

A further feature of this invention is the provision of a strip storage and feeding apparatus with a plurality of movable stock storage and feeding units, each unit comprising a plurality of groups of stock supply rolls so arranged to be progressed in an endless path in the unit so that one unit may be positioned and its groups successively brought to a withdrawing position, while another unit is positioned so that it or its groups may be removed for replenishment purposes. Thus, an attendant may start to replenish the supply of stock without removing an entire unit from the apparatus, and if it becomes apparent that all of the groups of such unit will not be replenished before the tire building operator has exhausted the supply in the other unit, the operation may be hastened by removing the remaining groups and substituting therefor other groups having a previously replenished supply thereon, or, if required to maintain continuous operation of the tire building machine, the attendant may replace an entire unit. In this way only a minimum number of replacement units or groups of supply rolls need be maintained on hand, thereby enabling a very high rate of production with a minimum amount of equipment.

Other features and advantages of this invention will become more apparent from the following description, reference being had to a preferred embodiment of the invention illustrated in the accompanying drawings. The essential features of the invention will be summarized in the claims.

Figure 2:
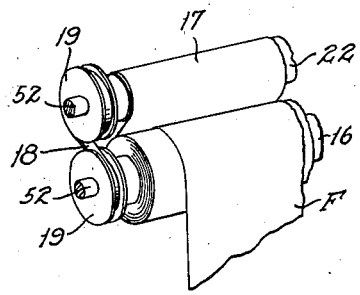
Figure 6:
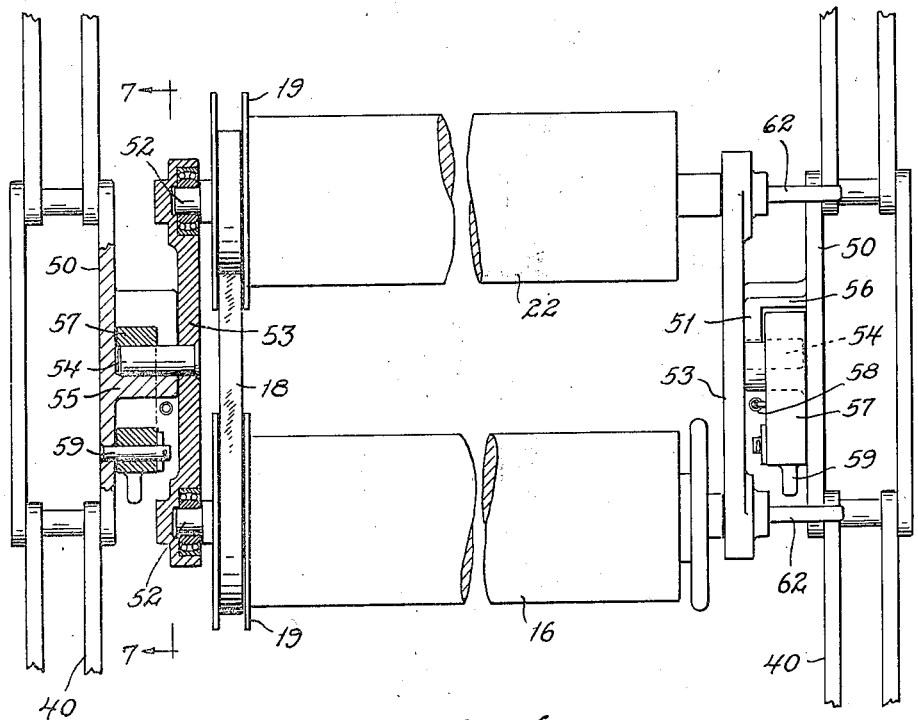
Figure 7:
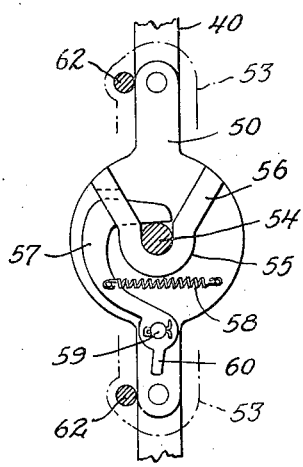

In the drawings, Fig. 1 is an elevation of a strip storage and feeding apparatus built in accordance with my invention, certain parts thereof being broken away to more clearly illustrate the internal construction of the apparatus; Fig. 2 is a fragmentary perspective view of one pair or group of stock storage rolls; Fig. 3 is an elevation looking at right-hand side of Fig. 1; Fig. 4 is a transverse vertical sectional view of the supporting frame of one unit removed from the apparatus; Fig. 5 is an elevation of one pair of stock storage rolls removed from the apparatus; Fig. 6 is a sectional detail on an enlarged scale, the plane of the section being indicated by the lines 6—6 on Fig. 1; Fig. 7 is a transverse sectional detail, the plane of the section being indicated by the lines 7—7 on Fig. 6.

Referring now to the drawings, I will first describe the apparatus which enables the attendant to operate the feeding mechanism while to replenish the supply of stock in one storage unit while the other unit is being used by a tire building machine operator. Such a mechanism in general forms the subject matter of my copending application for Letters Patent heretofore referred to, and reference may be had to such application for a more complete description thereof.

The strip feeding apparatus above referred to comprises a main frame or base 10, upon which a turret 11 is supported for rotary movement about a vertical axis, such as the axis of a centrally located, vertically extending spindle 12, suitably journalled in the base 10. The turret may be rotated by a power mechanism, such as a motor 14, drivingly connected in the usual manner to the spindle 12. Any suitable control may be provided to rotate the turret a predetermined angular distance, as desired, and locking devices may be provided, as indicated at 15, to secure the turret in the desired positions.

The turret carries a plurality of stock supply or storage units. Two such units are shown in the drawings. One unit is shown locked in an unloading position at the right-hand side of the machine in Fig. 1, while the other unit is locked in a stock replenishing position at the left-hand side of the machine. Each strip storage unit comprises an endless chain carrying a plurality of groups of storage rolls, each group comprising, as shown in Fig. 2, a supply roll 16 and a rewind roll 22 having an elongated flexible liner strip 17, so arranged that as it is unwound from either roll it will be wound upon the other roll. A supply strip F of the stock material is carried between the turns of the liner 17. Uniform turning of the rolls is secured, and uniform tension on the liner 17 is maintained, by a spring band 18 carried by a pair of pulleys 19 secured to the respective rolls of the pair, as is more fully explained in my prior United States Patent No. 1,952,904.

The groups of storage rolls in each unit are arranged to move in an endless path to successively position the groups and enable the stock carried by the rolls thereof to be withdrawn therefrom across a discharge table 20, supported by the base 10, to a tire building machine generally indicated at A, or to present the rolls to a feeding table 21 secured to the base 10 at the opposite side of the machine, depending, of course, upon the position of its respective unit. The groups in each unit are movable by an individual power operated mechanism, which may include a motor 25, mounted on the turret 11, and drivingly connected to a sprocket 26, which, through the medium of a drive chain 27, drives a sprocket 28. Each sprocket 28 is secured to a shaft 29, rotatably journalled in the turret 11 and drivingly connected to progress the supply rolls of its associated unit, as will be hereinafter more fully described.

Whenever a supply roll 16 is replenished while in the turret, a strip of fabric or stock is placed on the liner 17 and is wound onto the roll between layers of the liner which, in the meantime, has been unwound from the rewind roll 22. In the apparatus shown, the rolls 16 are rotated by a motor 30 mounted on the main frame 10 and drivingly connected with a pulley 31 mounted on a pivotally supported arm 32. The pulley carries a suitable friction driving member (not shown) adapted to frictionally engage the supply roll 16 whenever the arm 32 is swung about its pivot toward such roll.

The present invention is especially concerned with the replacement of the stock exhausted groups of rolls with stock replenished groups without disturbing any of the functions or advantages of the mechanisms heretofore described. To this end each unit is removably supported in the turret, so that it or the groups of any unit may be removed from the apparatus as a unitary device and replaced by a stock replenished unit or group. As illustrated in the drawings, and especially Figs. 1, 3 and 4, each unit includes a frame, which is bodily removable from the turret 11. Each frame may comprise a pair of vertically extending bars 35, having at their upper and lower ends cross-frame spacing members, in the nature of shafts 36 and 37. The shafts, as shown, carry sprocket wheels 38, which coact with chains 40, on which individual groups of storage rolls are mounted, as will be hereinafter more fully described. Each unitary frame may be removably mounted on the turret frame by pins 41 carried by the turret frame and adapted to engage bayonet like slots 42 formed in the bars 35 of the frame of the unit.

As heretofore mentioned, the groups of rolls are successively positioned in a stock replenishing or withdrawing position by the rotation of the shaft 29, which is driven by the sprocket 28. For this purpose, the shaft may be connected to the upper shaft 36 of a roll frame by a separable driving connection. As illustrated, the stock supplying, or roll frame is so arranged that when it is in position in the turret the upper shaft 36 thereof is in alignment with the sprocket shaft 29, and projects outwardly from the frame toward the inwardly projecting end of such sprocket shaft. The projecting ends of both shafts may be splined or squared to slidably and drivingly coact with a similarly formed opening in a sliding clutch member 44. As illustrated, the clutch member, when moved toward the turret frame, that is, to the left in Fig. 3, will be disengaged from the upper shaft 36 of the unit. To facilitate the setting of the clutch 44, it may be provided with a peripheral groove 45 arranged to be engaged by a clutch shifter arm 46, pivoted to the turret in the usual manner and positioned to facilitate its actuation by the attendant.

As heretofore explained, it is sometimes desirable that the attendant replenish the stock of as many of the groups as is possible, without removing such groups from the machine, and if all of the groups in the unit cannot be replenished with stock before the tire building machine operator has exhausted the supply of stock carried by the other unit, and is ready to rotate the turret to secure a fresh supply of stock, either a delay would be occasioned to permit the remaining unfilled groups of rolls to be replenished before rotating the turret, or the turret would be rotated with one unit carrying one or more groups of rolls unreplenished with stock. It is obvious that in either of these instances considerable delay would be occasioned. To avoid such delay and yet enable the attendant to restock as many groups as possible without removing them from the apparatus, each group is individually removable from the turret without removing an entire unit. Thus, if the tire builder is ready to rotate the turret to secure a stock replenished unit, he may remove those individual group or groups which he has not had sufficient time to replenish and replace them with individual groups which were previously replenished, as, for instance, in another machine, known as a bias cutter.

The apparatus of the present invention is so arranged that each group of rolls is removable from the apparatus as a unitary device independent of all other groups. To enable such removal, the alternate links of the chains 40 (Figs. 3, 6 and 7), which support the individual groups of rolls are provided with special links 50, having group supporting attachments 51 on their inner faces. These attachments project toward and removably engage respective groups. As shown, and heretofore described, each group comprises a pair of rolls 16. These rolls are each secured to a shaft 52, which is journalled in suitable bearings carried by bars 53. Each bar carries a pin 54 arranged to engage a seat 55 formed by a V-shaped rib 56 formed on the supporting links 50.

The pin 54 and hence the entire group is retained in position on the chain link 50 by a latch 57 (Figs. 6 and 7), which normally is retained in a latching position by a spring 58, carried by the link 50. The latch 57 is pivoted to the link as at 59 and to facilitate its release, it is provided with a tongue or handle 60, which may be grasped by the operator to move the latch against the action of the spring. The arrangement of the latch, spring and pivot is such that the latch may be rotated a distance sufficient to enable the spring to pass the center of the pivot, and thus retain the latch in its open position. To secure the group against rotation relative to its support, the bars 53 are provided with pairs of pins 62. These pins project outwardly from the bars, as shown in Fig. 6, and arranged to engage the face of the supporting links 50.

From the above description it will be seen that I have provided a strip storage and feeding device which enables the feeding of strips from a pair of storage rolls to a tire building machine and the simultaneously replenishing of the stock of the other pairs of rolls in the strip storage machine without necessitating the removal of the stock carrying rolls from the machine, and yet which is so arranged that a plurality of pairs or groups of storage rolls may be removed from the machine as a unitary device. Any of the groups may be removed as a unitary device without disturbing the other groups, thus eliminating any delay in the operation of the tire building machine which might otherwise be caused by the lack of a supply of stock, and without materially increasing the equipment required. Likewise, I have provided a stock storage and feeding mechanism wherein the stock supply may be quickly and easily replaced by a different type of stock to enable the tire building machine to be used in the manufacture of tires requiring different stocks without any appreciable loss of time between the changeover.

I claim:

1. In a strip feeding and storage device, a frame, a stock storage unit mounted in said frame, said unit having a pair of spaced shafts, driving means on said frame having a driving connection with one of said shafts, a sprocket on each shaft, an endless chain interconnecting said sprockets and comprising a plurality of inter-connected links, a plurality of groups of stock storage rolls removably carried by said chains, each group comprising a pair of rolls arranged and adapted to receive and store a strip of stock, said rolls being journalled in a supporting member, certain of the links of said chain being provided with seats to receive said supporting members, releasable latches to secure said supporting members in position on the respective seats, and means to prevent relative rotary movement between said links and the supporting members carried thereby.

2. In a strip feeding and storage device, a main frame, a turret rotatably mounted on said main frame, a plurality of stock storage units removably mounted in said turret, each unit comprising a frame having a pair of spaced shafts, driving means on said turret, a separable driving connection between said means and at least one shaft of each unit, sprockets on each of said shafts and an endless chain interconnecting the sprockets of its respective unit, groups of stock storage rolls removably carried by said chains, each group comprising a pair of rolls journalled in a common supporting member and a flexible liner interconnecting the pair of rolls and adapted and arranged to be wound on one roll as it is unwound from the other roll of its pair, and a tensioning device interconnecting said rolls, a releasable latch carried by said chains to secure said supporting members thereon, and means to prevent relative rotary movement between said chain and said supporting members.

3. In a strip storage and feeding device for tire building machines and the like, the combination of a frame, a pair of endless chains thereon, a series of stock storage units carried by the chains, each unit comprising a pair of rolls, and a pair of bars respectively at opposite ends of the rolls in which the rolls are journalled, means for removably connecting intermediate portions of the bars to the respective chains, and means for preventing bars rocking with reference to the chains.

4. In a strip storage and feeding device for tire building machines and the like, the combination of a pair of endless chains, a plurality of stock storage units each comprising a pair of rolls, a pair of bars respectively at opposite ends of the rolls, the rolls being rotatably mounted in the bars, the two chains having seats on their adjacent faces, the bars having pins occupying the seats, means for preventing the bars rocking with reference to the chain links carrying the seats.

5. In a strip storage and feeding device for tire building machines and the like, the combination of a frame, a pair of endless chains thereon, a series of stock storage units carried by the chains, each unit comprising a pair of rolls, and a pair of bars respectively at opposite ends of the rolls in which the rolls are journalled, means for removably connecting intermediate portions of the bars to the respective chains and a pair of pins projecting from one of the bars adjacent its respective ends, said pins engaging the same link of the chain whereby the unit may not rock with reference to the chain.

6. In a strip storage and feeding device for tire building machines and the like, the combination of a frame, a pair of endless chains thereon, seats formed on the inner sides of the two chains, storage units each comprising two rolls mounted at their opposite ends in carrying members, the chains and carrying members coacting and one of them having a stud and the other a seat to receive said stud, a movable latch for retaining said parts in engagement, and means preventing the units swinging with reference to the chain links carrying the same.

7. In a strip storage and feeding device for tire building machines and the like, the combination of a frame, a pair of endless chains thereon, seats formed on certain links of the two chains, said seats being intermediately positioned on the inner sides of the two chains and presenting recesses, storage units each comprising two rolls mounted in two bars respectively at opposite ends of the rolls, said bars having intermediately positioned projecting studs adapted to occupy the respective recesses, means on the chains for locking the studs in the recesses, and means preventing the units swinging with reference to the chain links carrying the same.

HENRY C. BOSTWICK.